US012439218B2

(12) United States Patent
Brown et al.

(10) Patent No.: US 12,439,218 B2
(45) Date of Patent: Oct. 7, 2025

(54) VIRTUALIZER FOR BINAURAL AUDIO

(71) Applicant: DOLBY LABORATORIES LICENSING CORPORATION, San Francisco, CA (US)

(72) Inventors: C. Phillip Brown, Castro Valley, CA (US); Yuxing Hao, Beijing (CN); Xuemei Yu, Beijing (CN); Zilong Yang, Beijing (CN)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 153 days.

(21) Appl. No.: 18/547,494

(22) PCT Filed: Feb. 25, 2022

(86) PCT No.: PCT/US2022/017823
§ 371 (c)(1),
(2) Date: Aug. 22, 2023

(87) PCT Pub. No.: WO2022/182943
PCT Pub. Date: Sep. 1, 2022

(65) Prior Publication Data

US 2024/0187806 A1 Jun. 6, 2024

Related U.S. Application Data

(60) Provisional application No. 63/266,500, filed on Jan. 6, 2022, provisional application No. 63/168,340, filed on Mar. 31, 2021.

(30) Foreign Application Priority Data

Feb. 25, 2021 (WO) ................ PCT/CN2021/077922

(51) Int. Cl.
*H04S 5/00* (2006.01)
*H04S 7/00* (2006.01)

(52) U.S. Cl.
CPC ................ *H04S 5/00* (2013.01); *H04S 7/305* (2013.01); *H04S 2400/01* (2013.01); *H04S 2400/05* (2013.01)

(58) Field of Classification Search
CPC . H04S 5/00; H04S 5/005; H04S 7/302; H04S 7/305; H04S 7/306; H04S 2400/01; H04S 2400/05; H04S 2420/01
(Continued)

(56) References Cited

U.S. PATENT DOCUMENTS

| | | | |
|---|---|---|---|
| 7,583,805 | B2 | 9/2009 | Baumgarte |
| 7,889,872 | B2 | 2/2011 | Bai |

(Continued)

FOREIGN PATENT DOCUMENTS

| | | | |
|---|---|---|---|
| CN | 108091345 A | 5/2018 | |
| CN | 108391199 A | 8/2018 | |

(Continued)

OTHER PUBLICATIONS

C. Phillip Brown, "A Structural Model for Binaural Sound Synthesis" IEEE Transaction on Speech and Audio Processing, vol. 6, No. 5, Sep. 1998, 13 pages.

(Continued)

*Primary Examiner* — Paul Kim

(57) ABSTRACT

Systems and methods for providing a binaural virtualization by upmixing the left and right input signals to produce left, right, and center channels, mixing the left and right input signals with the upmixed left and right channels respectively at a proportion given by a center-only reverb amount value, then reverberating the output of the mixing prior to virtualization. This can be further simplified by mode switching
(Continued)

between two different filtering modes: a standard mode and a simplified mode.

19 Claims, 5 Drawing Sheets

(58) Field of Classification Search
USPC .......................................................... 381/17
See application file for complete search history.

(56) References Cited

U.S. PATENT DOCUMENTS

| | | | |
|---|---|---|---|
| 7,917,236 | B1 | 3/2011 | Yamada |
| 7,949,141 | B2 | 5/2011 | Reilly |
| 8,045,718 | B2 | 10/2011 | Faure |
| 8,265,284 | B2 | 9/2012 | Villemoes |
| 8,654,983 | B2 | 2/2014 | Breebaart |
| 9,769,589 | B2 | 9/2017 | Umminger |
| 10,002,616 | B2 | 6/2018 | Miyasaka |
| 10,003,906 | B2 | 6/2018 | Brandenburg |
| 10,469,978 | B2 | 11/2019 | Lee |
| 10,771,914 | B2 | 9/2020 | Yen |
| 10,820,134 | B2 | 10/2020 | Stein |
| 10,848,900 | B2 | 11/2020 | Neukam |
| 2006/0198542 | A1 | 9/2006 | Benjelloun Touimi |
| 2020/0245094 | A1* | 7/2020 | Yen ........................ H04S 3/004 |
| 2020/0322727 | A1 | 10/2020 | Smyth |
| 2020/0335115 | A1 | 10/2020 | Breebaart |
| 2020/0367003 | A1 | 11/2020 | Fielder |
| 2020/0374644 | A1 | 11/2020 | Oh |

FOREIGN PATENT DOCUMENTS

| | | | |
|---|---|---|---|
| EP | 3090573 | B1 | 12/2018 |
| WO | 2010083137 | A1 | 7/2010 |
| WO | 2015134658 | A1 | 9/2015 |
| WO | 2019209930 | A1 | 10/2019 |
| WO | 2020151837 | A1 | 7/2020 |

OTHER PUBLICATIONS

Schroeder, M.R., "Natural Sounding Artificial Reverberation" Journal of the Audio Engineering Society, Jul. 1962, vol. 10, No. 3, pp. 219-223, 5 pages.

Sophocles J. Orfanidis, "High-Order Digital Parametric Equalizer Design," J. Audio Eng. Soc., vol. 53, No. 11, pp. 1026-1046, (Nov. 2005), 37 pages.

Woodworth, R. S., and Schlosberg, H. (1962). Experimental Psychology (Holt, New York), pp. 348-361. 7 pages.

* cited by examiner

VIRTUALIZER FOR BINAURAL AUDIO

CROSS REFERENCE TO RELATED APPLICATIONS

This application is a U.S. National Stage application under U.S.C. 371 of International Application No. PCT/US2022/017823, filed on Feb. 25, 2022, which claims priority to U.S. Provisional Application No. 63/266,500 filed on Jan. 6, 2022, and U.S. Provisional Application No. 63/168,340 filed on Mar. 31, 2021, titled "LIGHTWEIGHT VIRTUALIZER FOR BINAURAL SIGNAL GENERATION FROM STEREO" and International Application No. PCT/CN2021/077922 filed on Feb. 25, 2021, the contents of which are incorporated by reference in their entirety herein.

TECHNICAL FIELD

The present disclosure relates to improvements to binaural processing. More particularly, it relates to methods and systems for providing a lightweight process for binaural processing.

BACKGROUND

Audio systems typically are made up of an audio source (such as a radio receiver, smartphone, laptop computer, desktop computer, tablet, television, etc.) and speakers. In some cases, the speakers are worn proximal to the ears of the listener, e.g., headphones and earbuds. In that situation, it is sometime desirable to emulate the audio qualities of external speakers not proximal to the ears. This can be done by synthesizing the sound to create a binaural effect prior to sending the audio to the proximal speakers (henceforth referred to as headphones).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art based on this section, unless otherwise indicated.

SUMMARY

While synthesizing the sound to create a binaural effect prior to sending the audio to the speaker, not all audio sources are set up to do this synthesizing, and normal synthesizing circuity is too memory intensive and complex to be included in headphones or earbuds.

The methods and systems/devices described herein present a lower complexity (lightweight) means of creating quality binaural effects with channel-level controlled reverb. This, among other things, allows for binaural virtualization implementation in small devices, including headphones and earbuds, which would normally not be feasible.

The disclosure herein describes systems and methods for providing lightweight binaural virtualization that could be included in headphone, earbuds, or other devices that are memory and complexity sensitive. The systems and methods can be implemented as part of an audio decoder.

An embodiment of the invention is a device providing binaural virtualization, the device comprising: an input of a left input signal and a right input signal; a virtualizer; an upmixer configured to convert the left input signal and right input signal to a right channel, a left channel, and a center channel; a mixer configured to combine the left input signal with the left channel based on a center-only reverb amount value and combine the right input signal with the right channel based on the center-only reverb amount value, producing a mixer output; a reverb module configured to apply reverb to the mixer output for the virtualizer.

An embodiment of the invention is a method for providing binaural virtualization, the method comprising: receiving input of a left input signal and a right input signal; upmixing the left input signal and right input signal to a right channel, a left channel, and a center channel; mixing the left input signal with the left channel based on a center-only reverb amount value and mixing the right input signal with the right channel based on the center-only reverb amount value, thereby producing a mixer output; applying reverb to the mixer output for a virtualizer.

These embodiments are exemplary and not limiting: other embodiments can be envisioned based on the disclosure herein.

BRIEF DESCRIPTION OF DRAWINGS

FIG. 5A shows a straightforward virtualizer and FIG. 5B shows a more efficient virtualizer.

FIG. 6A shows a full mode and FIG. 6B shows a simplified mode.

DETAILED DESCRIPTION

As used herein, "lightweight" refers to a reduced memory and complexity implementation of circuitry. This reduces the footprint and energy consumption of the circuit.

As used herein, "HRIR" refers to the head related impulse response. This can be thought of as the time domain representation of an HRTF (head related transfer function) which describes how an ear receives sound from a source.

As used herein, "ITD" refers to the interaural time difference which describes the difference in time each ear receives from a given instance of sound from a source.

As used herein, "ILD" refers to the interaural level difference which describes the difference in perceived amplitude each ear receives from a given instance of sound from a source.

As used herein, "Butterworth filter" refers to a filter that is essentially flat in the passband.

As used herein, "binaural" refers to sound sent separately to each ear with the effect of a plurality of speakers placed at a distance from the listener and at a distance from each-other.

As used herein, "virtualizer" refers to a system that can synthesize binaural sound.

As used herein, "upmixing" is a process where M input channels are converted to N output channels, where N>M (integers). An "upmixer" is a module that performs upmixing.

As used herein, a "signal" is an electronic representation of audio or video, input or output from a system. The signal can be stereo (left and right signals being separate). As used herein, a "channel" is a portion of a signal being processed by a system. Examples of channels are left, right, and center.

As used herein, "module" refers to the part of a hardware, software, or firmware that operates a particular function. Modules are not necessarily physically separated from each other in implementation.

As used herein, "input stage" refers to the hardware and/or software/firmware that handles receiving input signals for a device.

Figure 1:
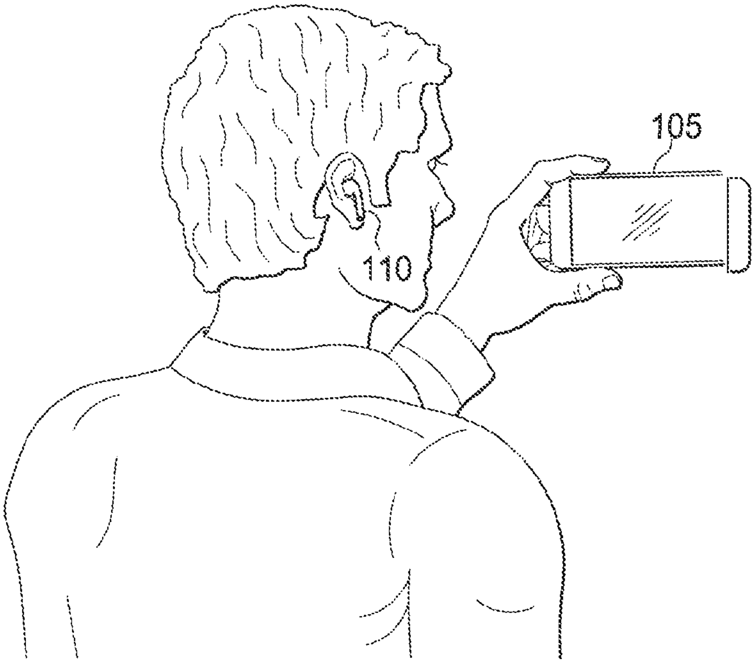
FIG. 1 illustrates an example use of the lightweight virtualizer.

FIG. 1 shows an example of a use of the lightweight virtualizer. A user has a mobile device (105), such as a smartphone or tablet, connected to stereo listening devices (110), such as earbuds, wired or wireless over-ear headphones, or portable speakers. If the sound-providing application ("app") running on the mobile device (105) does not provide binaural sound, the listening devices (110) having a lightweight virtualizer can synthesize the binaural effect.

Figure 2:
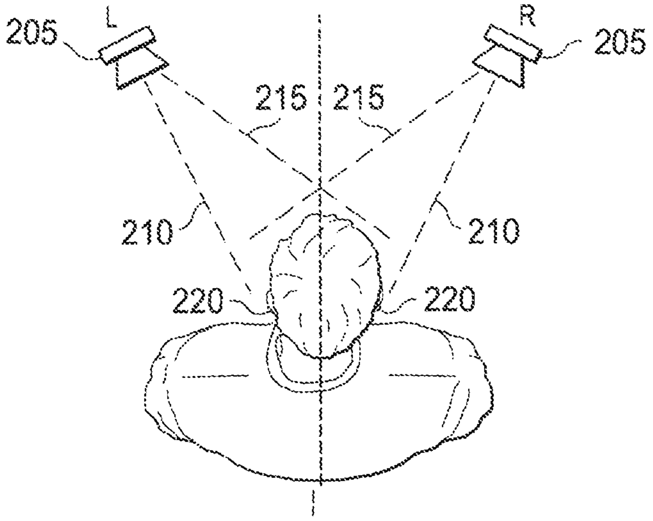
FIG. 2 illustrates an example of binaural audio.

FIG. 2 shows an example of binaural sound. In a non-synthesized system, two speakers (205) are placed in front of and to the left and right sides of the listener. The placement is such that the path (210) from each speaker to the closer of the listener's ears (220) provides a non-zero ITD and ILD compared to the path (215) to the opposite ear (220), i.e., "crosstalk". Virtualization attempts to synthesize this effect for headphones (220).

An HRIR head model from C. Phillip Brown, "*A Structural Model for Binaural Sound Synthesis*" IEEE Transaction on Speech and Audio Processing, vol. 6, No. 5, September 1998 is a combination of ITD and ILD. The ITD model is head radius and angle related based on Woodworth and Schlosberg's formula (see Woodworth, R. S., and Schlosberg, H. (1962), Experimental Psychology (Holt, New York), pp. 348-361). With the elevation angle set to zero, the formula becomes:

$$\mathrm{ITD}=(a/c)(\theta+\sin\theta) \tag{1}$$

By adding a minimum-phase filter to account for the magnitude response (head-shadow) one can approximate ILD cue. The ILD filter can additionally provide the frequency-dependent delay observed.

$$H(z)=\frac{b_0+b_1z^{-1}}{a_0+a_1z^{-1}} \tag{2}$$

By cascading ITD and ILD, the filter in time domain is:

$$ipsi: y[n]=\frac{b_{i0}}{a_{i0}}x[n]+\frac{b_{i1}}{a_{i0}}x[n-1]+\frac{a_{i1}}{a_{i0}}y[n-1] \tag{3}$$

$$contra: y[n]=\frac{b_{c0}}{a_{i0}}x[n-ITD]+\frac{b_{c1}}{a_{i0}}x[n-ITD-1]+\frac{a_{i1}}{a_{i0}}y[n-1] \tag{4}$$

A harmonic generator can generate harmonics based mostly on the center channel. It aims to provide virtual bass effect. It uses multiplication per sample of itself to generate a harmonic.

$$y=x(1-0.5|x|) \tag{5}$$

An equalizer can apply parametric or shelving filters, for example using a method from SO. J. Orfanidis, "*High-Order Digital Parametric Equalizer Design,*" J. Audio Eng. Soc., vol. 53, no. 11, pp. 1026-1046, (2005 November.).

Figure 3:
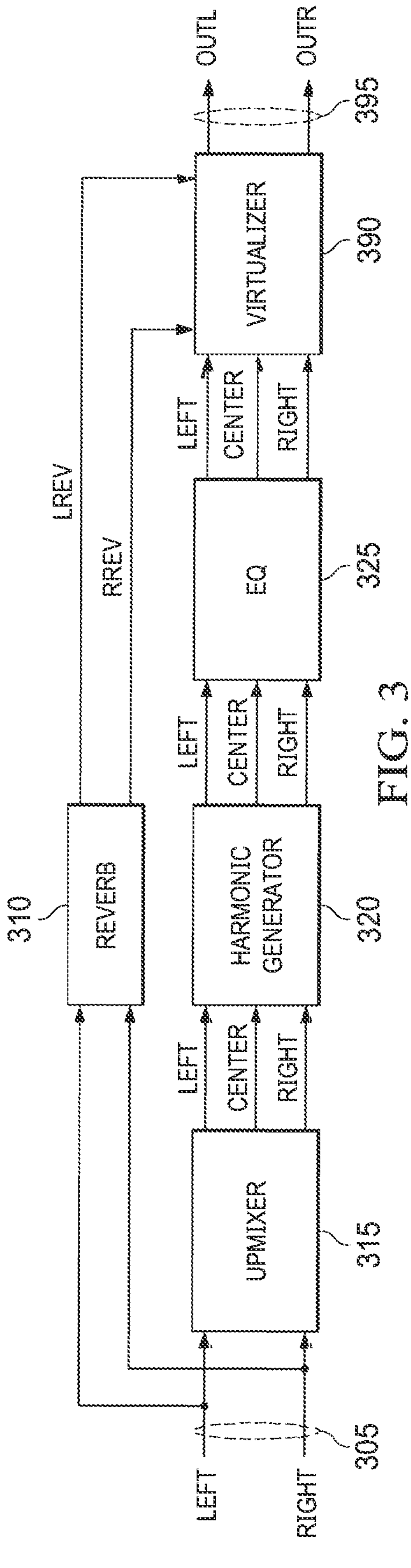
FIG. 3 illustrates an example setup for the lightweight virtualizer.

FIG. 3 shows an example basic lightweight virtualizer layout. The input (305) consisting of left and right input signals are sent to the reverb module prior to upmixing (310) to produce left and right reverb for the virtualizer module (390 as well as being sent to the upmixer module (315) for converting the left and right input signals to left, right, and center channels. These can then be sent to a harmonic generator (320) and an equalizer (325) for improved sound quality. The virtualizer module (390) takes the reverb output and the left, right, and center channels to synthesize binaural output (395) for the headphones.

In some embodiments, binaural sound is synthesized by controlling the amount of reverb on the channels by adjusting amplitudes based on a total reverb amount value.

Figure 4:
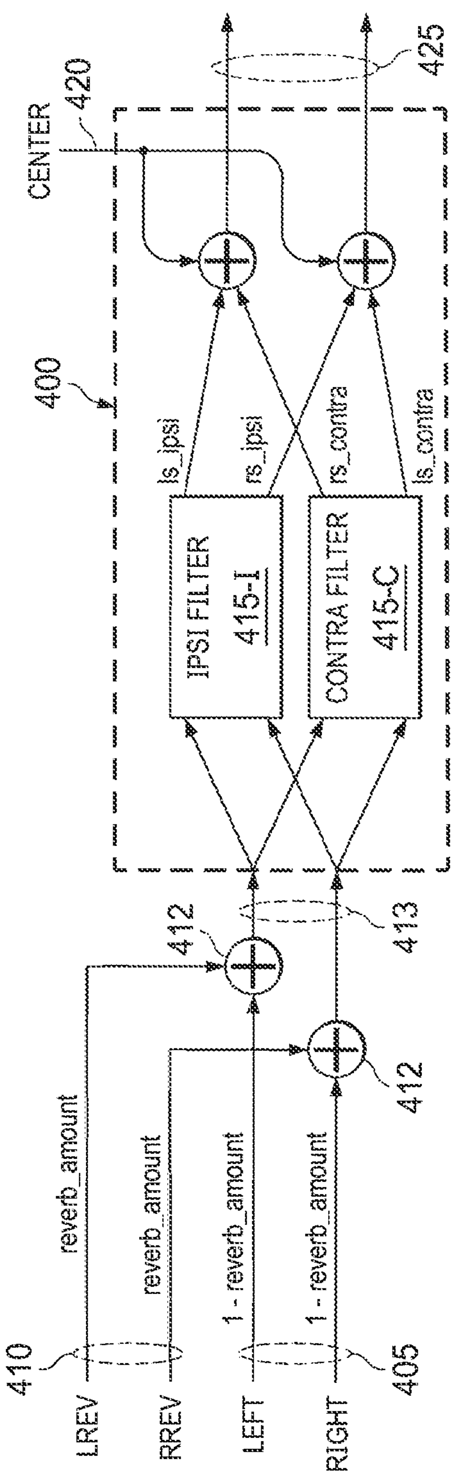
FIG. 4 illustrates an example of reverb control for the lightweight virtualizer.

FIG. 4 shows an example of reverb control. Before processing by the virtualizer (400), the left and right input signals (405) and the left and right reverb channels (410) are combined by a mixer (412). They are adjusted by a total reverb value (reverb amount) which has a value between no reverb (in this example, 0) and full reverb (in this example, 1). The mixing is proportional to the total reverb value. The mixing can be expressed as:

$$\overline{p_{rev}}=\alpha\overline{P_{rev}}+(1-\alpha)x \tag{6}$$

where $\alpha$ is the total reverb value, $\overline{p_{rev}}$ is the reverb signal input ($L_{rev}$ and $R_{rev}$), and x is the original input (L and R channels). The reverb amount can be smoothed block by block with first-order smoothing filter to avoid glitches by reverb amount changes.

The mixer output (413) is then passed through ipsi (415-I) and contra (415-C) filters, then mixed with the center channel (420), creating the virtualized binaural signal output (425).

The control of the total reverb amount allows control of the virtualization, thereby allowing the manufacturer of the headphones to adapt the virtualization to the specific hardware of the headphones and/or the user to adjust the virtualization experience. In some embodiments, a center-only reverb amount can be controlled by an API (application programming interface), for example from an app on a device paired with the headphones. This control can be automated by the software of the mobile device (e.g., upon detection of a voice in the audio that should have reduced reverb), or it can be set/adjusted the user through a user interface to provide a customized virtualization experience, or both. In some embodiments, the center-only reverb amount is set or adjusted by the headphones themselves (e.g., a pre-set value or offset value in the software/firmware), to provide the best balance based on how the hardware handles reverb.

In some embodiments, the center-only reverb amount is controlled independently from the total reverb amount (given the option of having different values from each other). This helps control the center-vs-(left+right) reverb amount to, for example, avoid too much reverb on voice audio on the center channel while still having enough reverb on the music to provide a virtualized 3D experience.

Figure 5A:
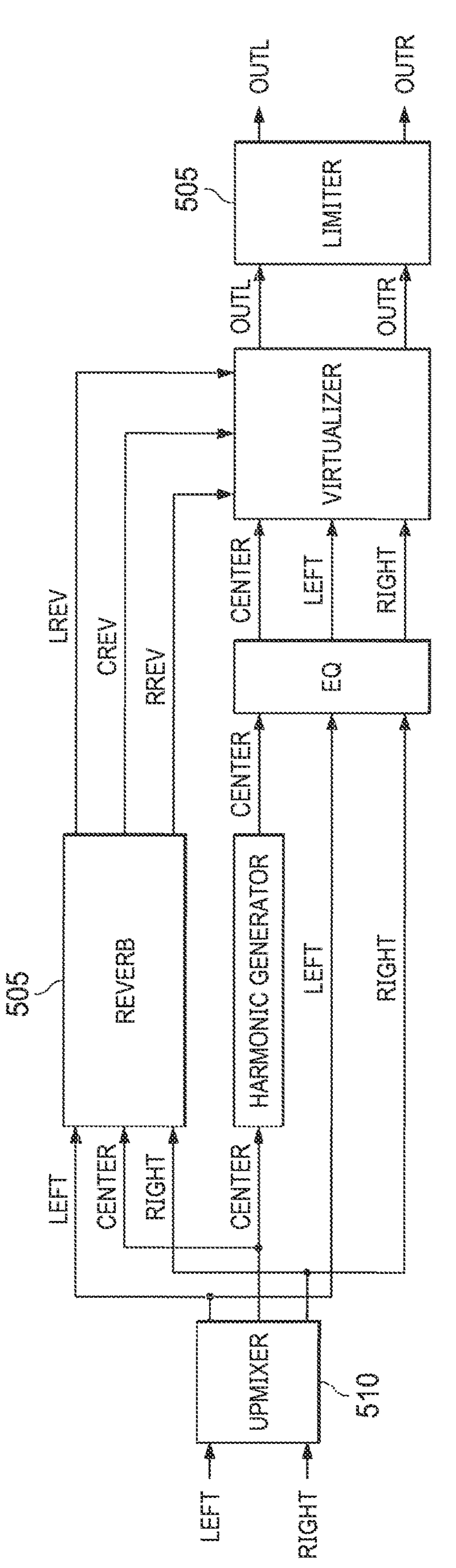
FIGS. 5A-5B illustrate example lightweight virtualizer setups.

A straightforward way to generate reverb on the center channel is shown in FIG. 5A. The reverb module (505) is fed a center channel along with the left and right channels from the upmixer (510). As shown in this example, a limiter (515) can be used to avoid clipping out of the digital range.

Figure 5B:
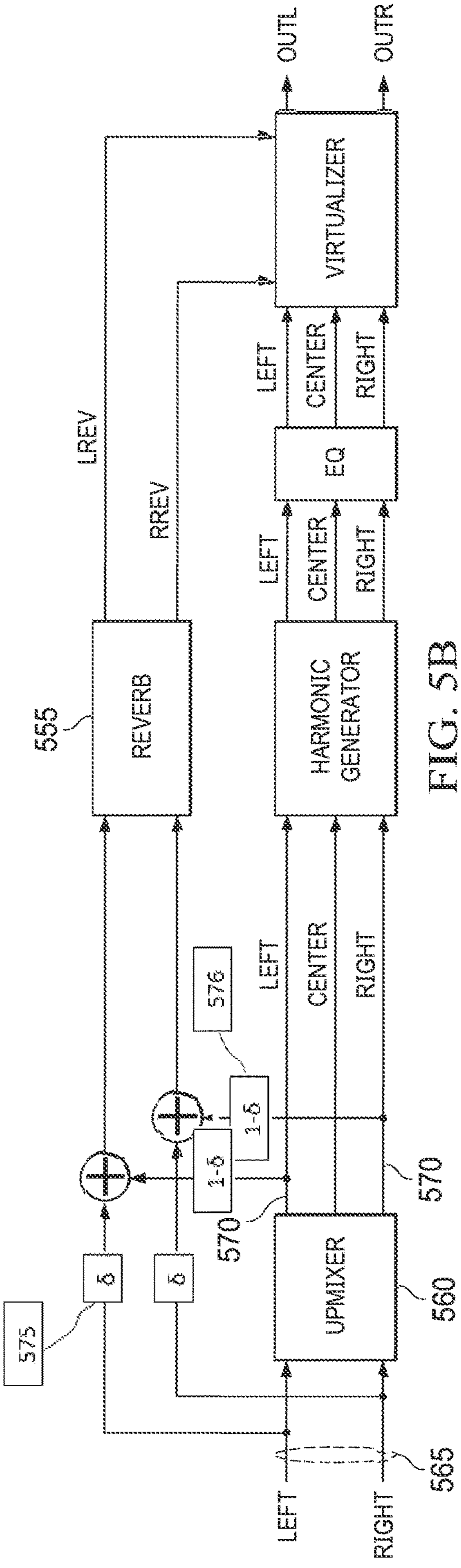

A more efficient way to generate reverb on the center channel is shown in FIG. 5B. The reverb module (555) is instead fed from a mixed input from the input channels (565) and the upmixed left and right channels (570) of the upmixer (560). The mixing is controlled by a center-only reverb value (center reverb amount) similarly to the mixing shown in FIG. 4. The L and R input signals have the center reverb amount (δ) applied to them (see gain blocks 575) while the upmixed L and R channels have the additive inverse of the center reverb amount with respect to 1 (1−δ) applied to them (see gain blocks 576). The effect is that when the center-only reverb value is at max (e.g., 1), then the center channel will have full reverb (the reverb module (555) will only receive the pre-upmixed left and right input signals, which inherently includes the center channel). When the center-only reverb value is at no reverb (e.g., 0), then the center channel will have no reverb (the reverb module (555) will only receive the post-upmixed left and right channels, which has had the center channel removed). Values in-between would adjust the center-only reverb proportionately (e.g., 0.5 would have the center at half the reverb as the left and right channels). The left and right reverb amounts remain unchanged by the center-only reverb value—they would only be controlled by what the total reverb setting is.

Both the center-only reverb value and the total reverb value can be separately controlled by an API.

The efficient reverb generation method (e.g., FIG. 5B) saves in both memory usage and complexity over the straightforward system (e.g., FIG. 5A), which is a significant step to making the system even more lightweight, as the reverb generator usually contributes a big part of memory usage and complexity in the system.

In some embodiments, the mix proportion is controlled as a piecewise non-linear function, such as:

$$\overline{p_{crev}}(r) = \begin{cases} 0, & w < thr \\ A(w - thr)^2 r, & w \geq thr \end{cases} \tag{7}$$

where r is the center-only reverb value (e.g., the API setting), A is a constant to normalize the results (provide a consistent volume), w is a value from the upmixer giving the proportion of a left or right channel (e.g., left channel) in the center channel, thr is a threshold value, and $\overline{p_{crev}}(\ )$ is the center-only reverb amount applied. This helps avoiding audio content that is less symmetrical in the left and right channels.

In some embodiments, reverb generation can be switched between two modes of complexity.

Figure 6A:
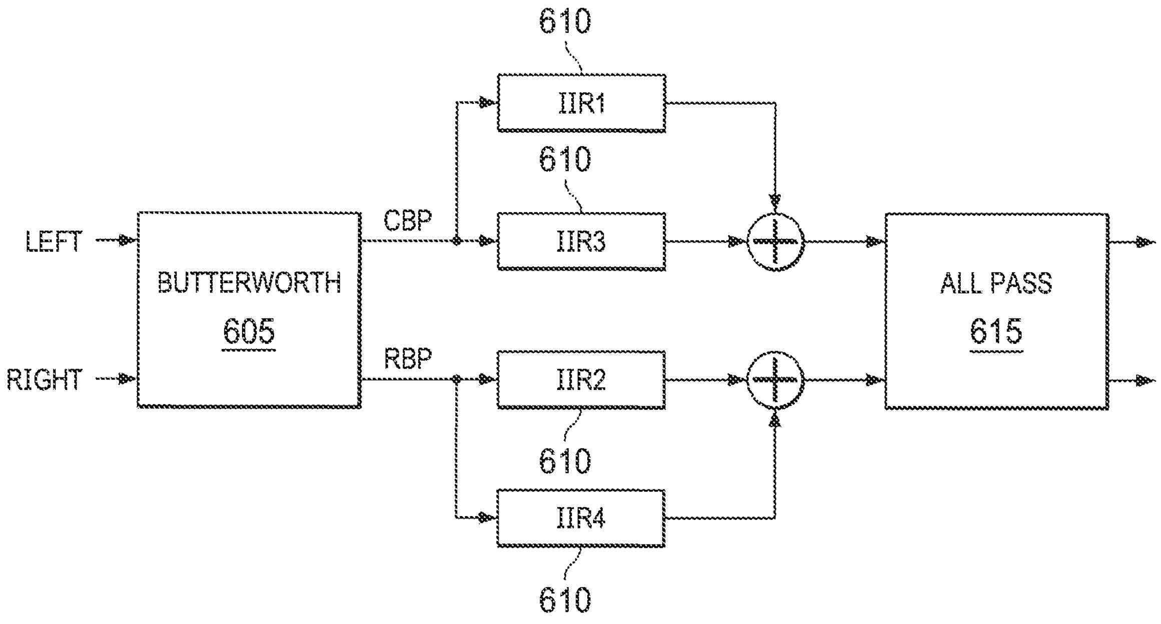
FIGS. 6A-6B illustrate examples of reverb generation modes.
Figure 6B:
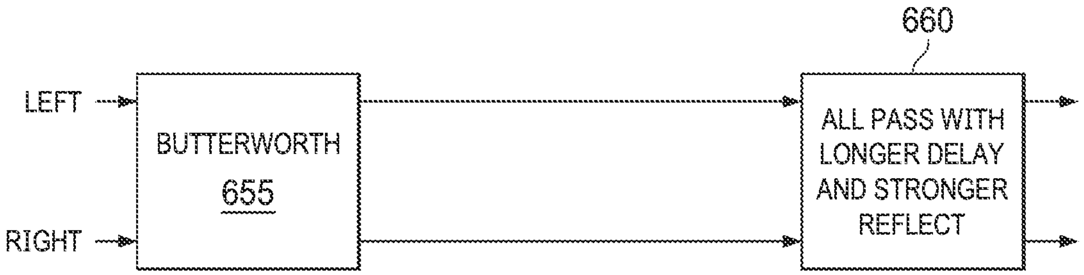

FIGS. 6A and 6B show an example of providing variable complexity for reverb generation.

FIG. 6A shows the normal (full complexity) mode of operation. Here, the reverb generator works with a low pass (e.g., Butterworth) filter (605), feeding into a comb filter (610), then to an all-pass filter (615) to alter the phase. The comb filter (610) consists of multiple infinite impulse response (IIR) filters with different latency values. This is memory and complexity intensive, and might produce a stronger reverb than desired.

The Z domain expressions of comb filter and all pass filter are $$H_{comb}(z, d) = \frac{1 - g_1 z^{-1} - g_2(1 - g_1)z^{-d}}{z^{-d} - g_1 z^{-d-1}} \tag{8}$$

-continued $$H_{allpass}(z, d) = \frac{1 + g_1 z^{-d}}{z^{-d} + g_1} \tag{9}$$

where $g_1$ and $g_2$ are reflection gains and d is a delay in samples.

FIG. 6B shows a simplified mode, the low-pass filter (655) is fed directly into an all-pass filter (660) having longer phase delay (to simulate a large room) and a stronger reflection factor. The volume of the audio is also boosted to compensate, giving audio with weaker reverb a typically clearer sound. The simplified mode decreases memory usage and complexity over the normal mode, so the ability to switch modes when needed (e.g., in memory and complexity critical cases) helps the lightweight virtualizer operate under a range of circumstances.

The following description of a further embodiment will focus on the differences between it and the previously described embodiment. Therefore, features which are common to both embodiments will be omitted from the following description, and so it should be assumed that features of the previously described embodiment are or at least can be implemented in the further embodiment, unless the following description thereof requires otherwise. In some embodiments, the lightweight virtualizer can detect if virtualization is not needed and bypass the virtualization. This can be by API instruction, machine learning derived binaural detection (see, e.g., Chunmao Zhang et al. "*Blind Detection Of Binauralized Stereo Content*", WO2019/209930A1, incorporated herein by reference in its entirety), or by receiving an identification of the mobile device or mobile device app that is known to have virtualization.

Figure 7:
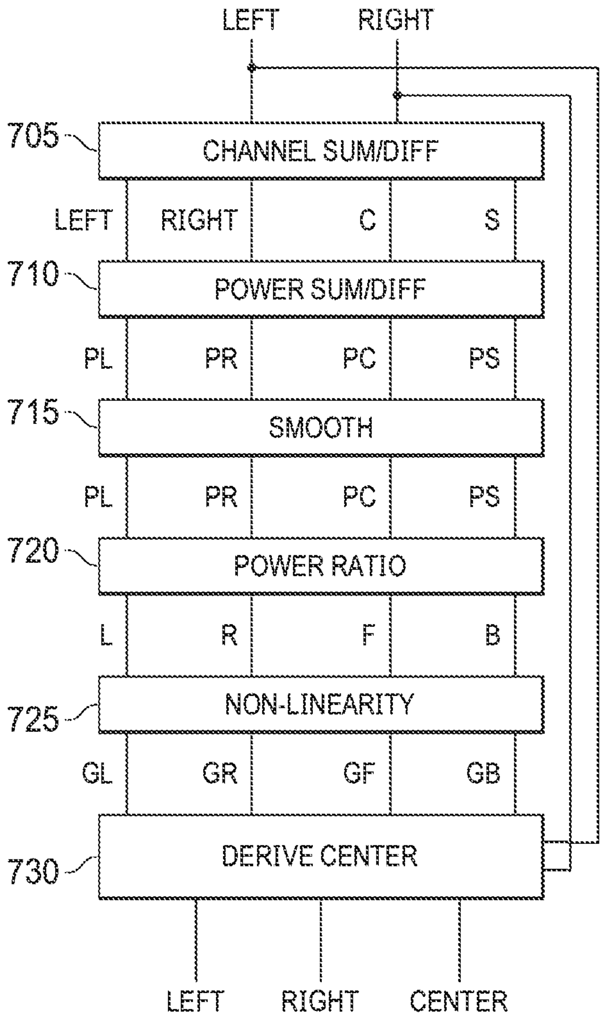
FIG. 7 illustrates an example upmixer process for the lightweight virtualizer.

FIG. 7 shows an example of an upmixer (2 to 3 channel upmix). It derives a virtual center channel from the left and right channels, thus achieve decorrelation of left and right, and enhance the separability of binaural signal. The upmix process is a form of active matrix decoding without feedback (see, e.g., C. Phillip Brown, "*Method and System for Frequency Domain Active Matrix Decoding without Feedback*" WO 2010/083137 A1, incorporated by reference in its entity herein). The upmixer considers the sum of left and right channels as the center channel and the difference between them as a side channel. The power of the four channels can be calculated and smoothed. The power ratio of left, right, front, and back can be derived from powers. The upmix coefficients of left, right, front, and back are calculated from a non-linearized power ratio. The derived virtual center channel is a linear combination of weighted left and right channels. In this example, the channel is summed and differenced (705) to provide left, right, center, and side channel. Power sums and differences (710) give power levels of those which are then smoothed (715). Power ratios are derived (720) for left, right, front, and back and upmix coefficients are calculated (725) and the center channel is derived (730).

Figure 8:
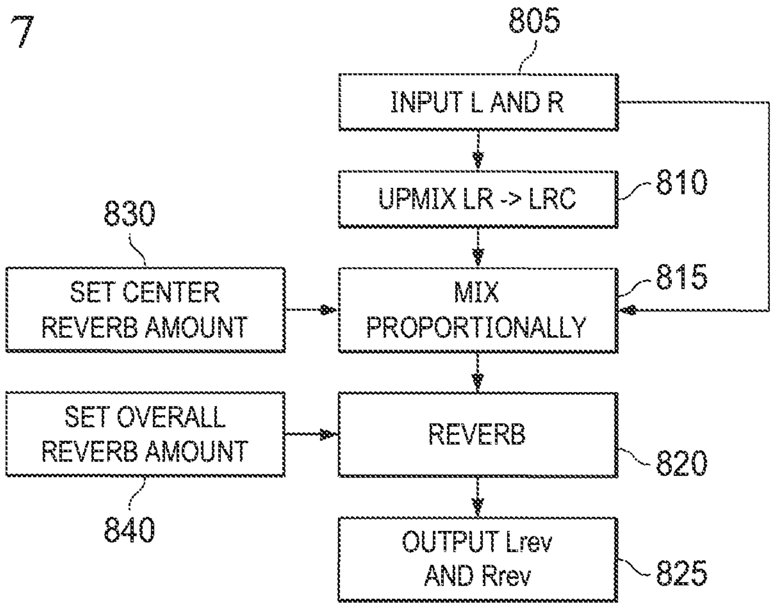
FIG. 8 shows an example of a lightweight virtualizer method.

FIG. 8 shows an example flowchart of a basic lightweight virtualizer method. The system takes in at an input stage (805) left and right input signals from the audio source. These are then upmixed (810) to upmixed versions of the left, right and center channels. The upmixed left and right channels and the input signals are then mixed (815) based on a proportionality scale, the center-only reverb amount, set (830) by system or by the API. The mixed channels are then given reverb (820) based on a total reverb amount which is also set (840) by the system or an API. This is then output (835) as the left and right reverberated channels for further processing (e.g., virtualization with the input or post-processed input).

Several embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains.

It is to be understood that the disclosure is not limited to particular methods or systems, which can, of course, vary. It is also to be understood that the terminology used herein is for the purpose of describing particular embodiments only and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A device providing binaural virtualization, the device comprising:

an input stage configured to receive a left input signal and a right input signal;

a virtualizer configured to perform virtualization creating binaural effect on audio of the left input signal and the right input signal;

an upmixer configured to convert the left input signal and right input signal to a right channel, a left channel, and a center channel;

a mixer configured to combine the left input signal with the left channel based on a center-only reverb amount value and combine the right input signal with the right channel based on the center-only reverb amount value, producing a mixer output; and a reverb module configured to apply reverb to the mixer output input to the virtualizer which outputs virtualized binaural signal output.

2. The device of claim 1, wherein the reverb module is configured to adjust the reverb by a total reverb amount value.

3. The device of claim 2, wherein the center-only reverb amount value and the total reverb amount value are set independently.

4. The device of claim 1, further comprising at least one of a harmonic generator and an equalizer between the upmixer and the virtualizer.

5. The device of claim 1, wherein the device is configured to detect if the left input signal and the right input signal are already binaural.

6. The device of claim 5, wherein the device detects if the left input signal and the right input signal are already binaural by receiving an identification from a source of the left input signal and the right input signal.

7. The device of claim 5, wherein the device detects if the left input signal and the right input signal are already binaural by machine learning binaural detection.

8. The device of claim 5, wherein the device detects if the left input signal and the right input signal are already binaural by API instruction.

9. The device of claim 1, wherein the virtualizer is part of an audio decoder.

10. A method for providing binaural virtualization, the method comprising:

receiving input of a left input signal and a right input signal;

upmixing the left input signal and right input signal to a right channel, a left channel, and a center channel;

mixing the left input signal with the left channel based on a center-only reverb amount value and mixing the right input signal with the right channel based on the center-only reverb amount value, thereby producing a mixer output;

applying reverb to the mixer output input to a virtualizer; and outputting virtualized binaural signal output from the virtualizer.

11. The method of claim 10, further comprising adjusting the reverb by a total reverb amount value.

12. The method of claim 11, wherein the center-only reverb amount value and the total reverb amount value are set by an API.

13. The method of claim 10, further comprising at least one of harmonic generation and equalization after the upmixing.

14. The method of claim 10, further comprising detecting if the left input signal and the right input signal are already binaural.

15. The method of claim 14, wherein the detecting is done by receiving an identification from a source of the left input signal and the right input signal.

16. The method of claim 14, wherein the detecting is done by machine learning binauraliztion detection.

17. The method of claim 14, wherein the detecting is done by API instruction.

18. The method of claim 10, further comprising switching between a standard filter mode and a simplified filter mode, wherein the standard filter mode comprises using a comb filter and the simplified filtered mode does not.

19. A non-transitory computer readable medium comprising data, which when executed by a processor, configured to carry out the steps of the method of claim 10.

* * * * *